Patented June 24, 1952

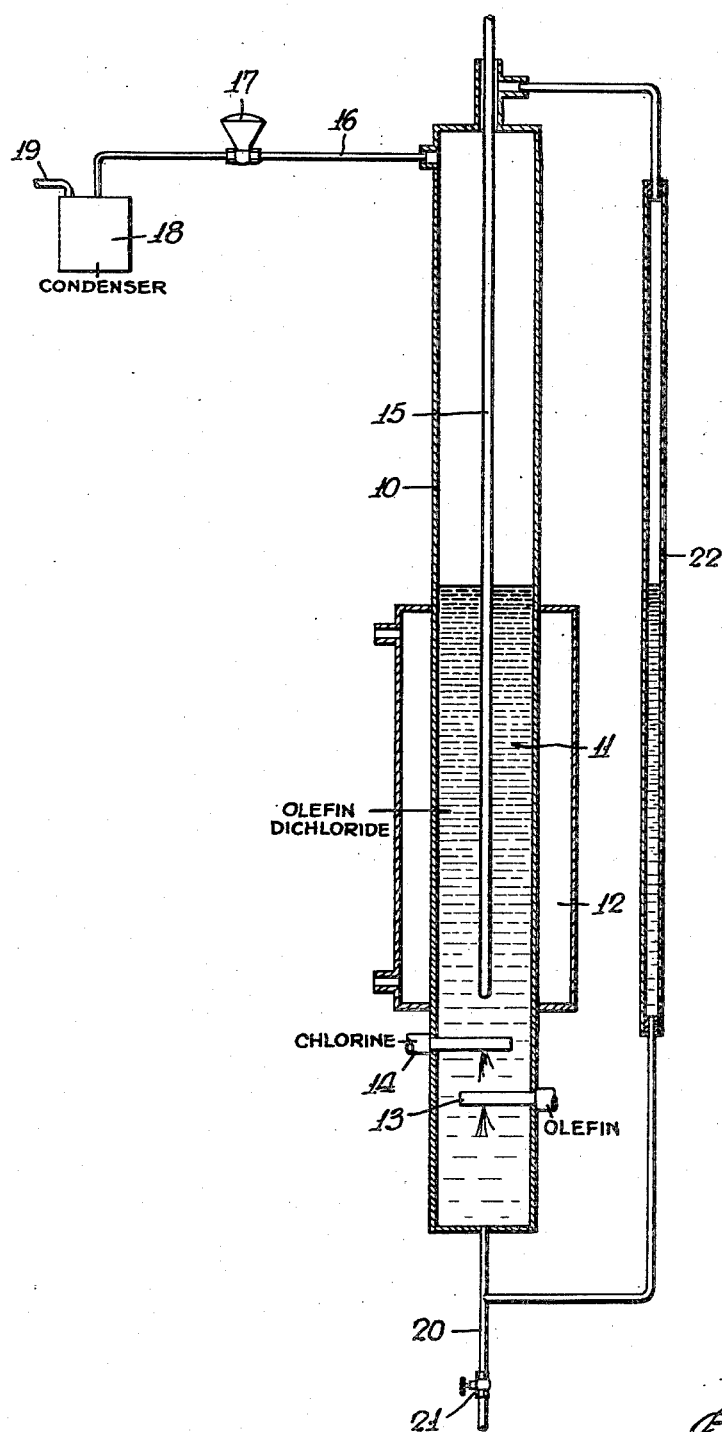

2,601,322

UNITED STATES PATENT OFFICE 2,601,322

PROCESS OF PREPARING OLEFIN DICHLORIDES IN THE PRESENCE OF AN INHIBITOR FOR SUBSTITUTION REACTIONS

Robert Repp Reese, Port Arthur, Tex., assignor to Jefferson Chemical Company, Inc., New York, N. Y., a corporation of Delaware Application July 3, 1948, Serial No. 36,918

13 Claims. (Cl. 260—660)

This invention relates to the production of olefin dichlorides by chlorinating olefins while inhibiting the formation of chlorine substitution products, and more particularly to the production of ethylene dichloride under conditions inhibiting the formation of 1,1,2-trichloroethane and other highly chlorinated ethanes.

This invention is applicable to the chlorination of propylene, butylene, amylene, etc. However, since at the present time the principal commercial demand is for ethylene dichloride, the description which follows will largely be confined to the chlorination of ethylene. It will be understood, however, that this invention is not limited to the chlorination of ethylene and includes the chlorination of other olefins, particularly propylene, to produce olefin dichlorides.

It is an object of this invention to provide an improved method of chlorinating olefins, particularly ethylene to produce olefin dichlorides under conditions inhibiting the formation of chlorine substitution products.

Other objects and advantages of this invention will be apparent from the following detailed description thereof.

This invention is based on the discovery that iron oxide when present during the reaction of ethylene and chlorine in a body of liquid ethylene dichloride into which the reactants are introduced functions to inhibit substitution reactions and hence results in an improvement in the yield of ethylene dichloride and in the production of an ethylene dichloride product substantially free of impurities.

Iron oxide may be added as such, for example, by the addition of pieces of rusty iron to the body of liquid ethylene dichloride into which the ethylene and chlorine are introduced, additional iron oxide being added, if needed, from time to time to maintain an appreciable amount of iron oxide in the reaction zone where the chlorine and ethylene combine to form ethylene dichloride. The amount of iron oxide present in the reaction zone is not critical as long as an appreciable concentration of iron oxide is maintained in this zone. Preferably, the iron oxide is produced in situ in the body of ethylene dichloride by the reaction of oxygen or an oxygen containing gas, e. g., air, with iron present in the reaction zone. Desirably, an oxygen containing gas is added to the ethylene gas stream, passed into the body of ethylene dichloride containing iron, so that the iron is oxidized, producing iron oxide in situ in the reaction zone. In this way as long as oxidizable iron is present in the reaction zone the formation of iron oxide which inhibits substitution reactions is insured.

The temperature at which the reaction is carried out may be any temperature at which the olefin dichloride into which the olefin and chlorine are introduced remains in the liquid phase under the pressure conditions employed. Desirably the reaction of ethylene and chlorine to produce ethylene dichloride is carried out within the range of from 70° to 200° F., preferably from 110° to 150° F. The reaction may be effected at any desired pressure at which the olefin dichloride into which the olefin and chlorine are introduced remains in the liquid phase; for example, in the production of ethylene dichloride a pressure within the range of from 0 to 250 pounds per square inch gauge, preferably from about 25 to about 50 pounds per square inch gauge, is maintained in the reaction zone.

The reactants are supplied in proportions such that there is an excess of olefin over and above the stoichiometric amount required to react with the chlorine to produce olefin dichloride. While the amount of this excess is not critical, in the interests of economy an excess of from 2 to 40 mol percent., preferably 5 to 25 mol percent. ethylene, over and above the stoichiometric amount required to react with the chlorine to produce ethylene dichloride is preferred.

The reaction may be conducted in any suitable equipment reasonably resistant to corrosion by the reactants and reaction product. Steel equipment has been found satisfactory.

The accompanying drawing illustrates diagrammatically one form of apparatus suitable for the practice of this invention.

In the drawing 10 indicates a cylindrical reaction tower containing a body 11 of olefin dichloride and provided with a water jacket 12 for circulating cooling water therethrough to remove the exothermic heat of reaction and retain the desired temperature conditions within the reactor. The base of the reactor is provided with an inlet 13 for olefin or a mixture of olefin and oxygen and a second inlet 14 for chlorine. The chlorine inlet 14 desirably is disposed above the inlet 13, as shown in the drawing. A thermometer well 15 extends within the reactor for the reception of a series of thermocouples indicating the temperatures within the reaction zone.

The top of reactor 10 is provided with a line 16 equipped with a pressure control valve 17 for maintaining the desired pressure conditions within the reactor. Unreacted gases leave reactor 10 through line 16 and flow through valve 17 into a condenser 18 for condensing olefin dichloride vapors carried out of the reactor in the vapor phase with the off-gas. Uncondensed gases leave condenser 18 through line 19. The base of reactor 10 is equipped with a product drawoff 20 provided with a valve 21. Reactor 10 desirably is provided with a gauge glass 22 indicating the level of the body of olefin dichloride 11 therein.

The four examples which follow are illustrative of the invention carried out in equipment, such as shown in the drawing. In all four examples a steel reactor was used having a diameter of 4" and height of 8'. The ethylene used analyzed as follows:

|  | Per cent |
|---|---|
| Ethylene gas by volume _____ minimum __ | 95 |
| Methane and ethane _____ maximum __ | 5 |
| Carbon dioxide _____ do ____ | 0.5 |
| Acetylene _____ do ____ | 0.5 |
| Acetone _____ | 0.3 |
| Oil _____ None | |
| Foreign material _____ None | |
| Higher olefins _____ maximum __ | 0.5 |

The reaction products throughout the runs were analyzed by standard distillation procedure to determine their ethylene dichloride content.

It will be understood this invention is not limited to these examples.

*Example I*

Fifty pieces of ½" x ½" rusty steel pipe were suspended in the reactor just above the chlorine gas inlet. 25.25 pounds of ethylene dichloride were placed in the reactor. Chlorine was fed to the reactor at a rate of 4.39 pounds per hour and ethylene at a rate of 2.3 pounds per hour. Thus 75% of the theoretical amount of chlorine required to react with the ethylene to form ethylene dichloride was supplied. The chlorine and ethylene were continuously fed to the reactor which was maintained at a pressure of 30 pounds per square inch gauge. During operation the level of the body of ethylene dichloride within the reactor was 42" above the base of the reactor. Reaction product was withdrawn at a rate of 5.87 pounds per hour. This run lasted for 21 hours. The temperature at the top of the reactor throughout the run was 83° F.; at the middle it was 113° F.; and at the base it was 129° F. At the end of the 4th hour the reaction product then withdrawn was analyzed and found to contain 99% ethylene dichloride. At the end of the 8th hour the reaction product then withdrawn was analyzed and found to contain 99% ethylene dichloride. At the end of the 11th hour the reaction product then withdrawn was analyzed and found to contain 97% ethylene dichloride. At the end of the 20th hour the reaction product then withdrawn was analyzed and found to contain 97% ethylene dichloride.

*Example II*

Fifty-two clean pieces of steel pipe rings were suspended above the chlorine inlet. 20.5 pounds of ethylene dichloride were introduced into the reactor. Chlorine was fed at the rate of 4.18 pounds per hour; the ethylene at a rate of 2.3 pounds per hour. Thus, 72% of the theoretical amount of chlorine required to react with the ethylene was introduced into the reaction zone. Air was continuously fed into the ethylene stream at the rate of .24 pound per hour. 5.6 pounds of reaction product were withdrawn per hour. The level of the ethylene dichloride within the reactor was 34" above the base. The reactor was maintained at a pressure of 30 pounds per square inch gauge throughout this run which lasted for 34 hours. The temperature at the top of the reactor was 85° F., in the middle 122° F. and at the bottom 129° F. Reaction product withdrawn at the end of the 2nd, 6th, 10th, 14th, 16th, 20th, 24th, 28th and 32nd hour was analyzed and found to contain, respectively, 99.5%, 99.5%, 99%, 97%, 98%, 99%, 99%, 98%, 98% ethylene dichloride.

*Example III*

This example differed from Example II chiefly in that chlorine was fed at a somewhat higher rate, namely, 4.8 pounds per hour so that the amount of chlorine introduced into the reaction zone was 82% of the theoretical amount required to react with the ethylene to produce ethylene dichloride. 6.1 pounds of reaction product per hour were withdrawn during this run which lasted 7 hours. The level of ethylene dichloride within the reactor was 30" above the base and the temperature conditions at the top, middle and bottom of the reactor were, respectively, 84° F., 118° F., and 130° F. Reaction product withdrawn at the end of the 2nd, 4th, 6th and 7th hours, respectively, was analyzed and found to contain 99.5%, 99.5%, 99% and 99% ethylene dichloride.

*Example IV*

In this example 16.75 pounds of ethylene dichloride were charged into the reactor which was packed to a height of 18" with ½" x ½" steel pipe rings covered by a small amount of rust. The ethylene was introduced into the reactor at the rate of .074 pound mols per hour and the chlorine at a rate of .068 pound mols per hour. During the first 16 hours of operation no air was mixed with the ethylene introduced into the reactor. At the end of the 2nd, 6th, 12th and 16th hours of operation the reaction product withdrawn from the reactor was analyzed by distillation and found to contain 98%, 99%, 88% and 80% ethylene dichloride, the rest being trichloroethane and other higher chlorination products of ethylene. From this it is evident that during the first six hours of operation the iron oxide present on the steel rings inhibited the formation of higher chlorination products of ethylene but that after the 6th hour, when the iron oxide had been removed, the steel rings no longer exercised any appreciable inhibiting effect on the substitution reactions.

After the 16th hour air in amount of .0028 pound mols per hour was mixed with the ethylene and the air-ethylene stream passed through the reactor, the run being continued for another 4 hours. At the end of the 2nd hour of the continuation of the run the reaction product withdrawn was analyzed and found to contain 95% ethylene dichloride and 5% chlorination products of ethylene. After two more hours of operation the reaction product then withdrawn was analyzed by distillation and found to contain 99% ethylene dichloride and 1% higher chlorination products of ethylene.

This example demonstrates that the small amount of rust on the steel rings initially introduced into the reactor was sufficient to inhibit substitution reactions for well over six hours, that after 16 hours of operation the inhibiting effect of the iron oxide had been substantially lost, and that the introduction of air with the ethylene effecting oxidation of the iron to produce iron oxide in situ rapidly restored the desired conditions within the reactor inhibiting substitution reactions.

The following example is illustrative of the production of propylene dichloride in accordance with this invention. This example was carried out in a glass reactor having a diameter of 2" and height of 41" waterjacketed to permit cooling. The propylene inlet was at the base and the chlorine was introduced about 8" above the base. The reactor was packed with iron nails. Before the start of the run the packed reactor was filled with pure propylene dichloride. As the run progressed, liquid product and off-gas were led from the top of the reactor, first to a product trap and thence to a gas scrubber. In the run embodying this invention oxygen was added to the propylene feed. For purposes of comparison a run was made under substantially the same conditions and in the same equipment except that the reactor was packed with $\frac{1}{4}$" ceramic saddles instead of the iron nails and no air or oxygen was added to the propylene feed. Data on these two runs were as follows:

|  | Run Embodying This Invention | Comparative Run |
| --- | --- | --- |
| Duration in hours | 7.5 | 5.5 |
| Weight of Propylene Dichloride Charged, grams | 1,710 | 1,476 |
| Reactor temperature, °C | 45 | 46 |
| Chlorine, Grams Mols/hr | 4.8 | 5.36 |
| Propylene, Gram Mols/hr | 5.90 | 5.90 |
| Chlorine, Mol Per cent of theory | 83 | 91 |
| Oxygen, Per cent in Propylene Feed | 15.5 | nil |
| Product Analysis of Product Withdrawn at End of Run Per cent by Weight: |  |  |
| Propylene Dichloride | 90 | 65 |
| Higher Chlorination Products | 10 | 35 |

It will be apparent from the above that the use of oxidized iron, introduced as such or produced in situ, inhibits substitution reactions and improves the yield of olefin dichlorides. This invention results in the production of ethylene dichloride substantially free of impurities.

In practicing the process of this invention to produce propylene dichloride, propylene dichloride is employed as the liquid medium into which the propylene and chlorine are introduced. Likewise when making other olefin dichlorides the desired olefin dichloride reaction product is employed as the liquid medium into which the olefin and chlorine are introduced. In this way contamination of the reaction product is avoided.

It is to be understood that this invention is not restricted to the present disclosure otherwise than as defined by the appended claims.

What is claimed is:

1. The process of preparing an olefin dichloride, which comprises reacting an olefin and chlorine in a liquid body of said olefin dichloride and in the presence of relatively small pieces of iron oxide immersed in said liquid body of olefin dichloride as an inhibitor for substitution reactions.

2. The process of preparing an olefin dichloride as defined in claim 1, in which the iron oxide is produced in situ by reaction of iron added as such to the liquid body of olefin dichloride and oxygen introduced into said body of olefin dichloride.

3. The process of preparing an olefin dichloride, which comprises feeding an excess of olefin over and above the stoichiometric amount required to react with chlorine to produce said olefin dichloride and chlorine into a liquid body of said olefin dichloride, and reacting said olefin and chlorine to produce said olefin dichloride in said liquid body in the presence of relatively small pieces of iron oxide immersed in said liquid body as an inhibitor for substitution reactions.

4. The process of preparing an olefin dichloride as defined in claim 3, in which the iron oxide is produced in situ by reaction of iron added as such to the liquid body of olefin dichloride and oxygen introduced into said body of olefin dichloride.

5. The process of preparing an olefin dichloride, which comprises maintaining a liquid body of said olefin dichloride, immersing in said liquid body relatively small pieces of iron oxide as an inhibitor for substitution reactions, passing an olefin and chlorine into said body of olefin dichloride, the amount of said olefin being in excess of the stoichiometric amount required to react with chlorine to produce said olefin dichloride and reacting said olefin and chlorine in said liquid body in the presence of said relatively small pieces of iron oxide to produce said olefin dichloride.

6. The process of preparing ethylene dichloride, which comprises reacting ethylene and chlorine in a liquid body of ethylene dichloride and in the presence of relatively small pieces of iron oxide immersed in said body of ethylene dichloride as an inhibitor for substitution reactions.

7. The process of preparing ethylene dichloride as defined in claim 6, in which the iron oxide is produced in situ by reaction of iron added as such to said body of ethylene dichloride and oxygen introduced into said body of ethylene dichloride.

8. The process of preparing ethylene dichloride, which comprises feeding an excess of ethylene over and above the stoichiometric amount required to react with chlorine to produce ethylene dichloride and chlorine into a liquid body of ethylene dichloride, reacting said ethylene and chlorine in said liquid body in the presence of relatively small pieces of iron oxide immersed in said body of ethylene dichloride as an inhibitor for substitution reactions to produce ethylene dichloride, and recovering the ethylene dichloride thus produced.

9. The process of preparing ethylene dichloride as defined in claim 8, in which the iron oxide is produced in situ by reaction of iron added as such to said body of ethylene dichloride and oxygen introduced into said body of ethylene dichloride.

10. The process of preparing ethylene dichloride, which comprises maintaining a body of liquid ethylene dichloride, introducing into said body of liquid ethylene dichloride relatively small pieces of iron oxide, passing ethylene and chlorine into said body of ethylene dichloride, the amount of ethylene thus passed into said body being in excess of the stoichiometric amount required to react with chlorine to produce ethylene dichloride, reacting said ethylene and chlorine in said liquid body in the presence of said relatively small pieces of iron oxide at a temperature of from 110° to 150° F. and under superatmospheric pressure to produce ethylene dichloride, and recovering the ethylene dichloride thus produced.

11. The process of preparing ethylene dichloride, which comprises feeding chlorine, ethylene and oxygen over relatively small pieces of iron immersed in a body of ethylene dichloride and reacting the chlorine and ethylene to produce ethylene dichloride while simultaneously producing in situ iron oxide by reaction of the relatively small pieces of iron and the oxygen which iron oxide acts as an inhibitor for substitution reactions between chlorine and ethylene.

12. The process of preparing propylene dichloride, which comprises reacting propylene and chlorine in a liquid body of propylene dichloride and in the presence of relatively small pieces of iron oxide immersed in said body of propylene dichloride as an inhibitor for substitution reactions.

13. The process of preparing propylene dichloride as defined in claim 12, in which the iron oxide is produced in situ by reaction of iron added as such to the body of propylene dichloride and oxygen introduced into said body of propylene dichloride.

ROBERT REPP REESE.

REFERENCES CITED

The following references are of record in the file of this patent:

UNITED STATES PATENTS

| Number | Name | Date |
|---|---|---|
| 1,952,122 | Deanesly | Mar. 27, 1934 |
| 2,393,367 | Hammond | Jan. 22, 1946 |

FOREIGN PATENTS

| Number | Country | Date |
|---|---|---|
| 553,959 | Great Britain | June 11, 1943 |

OTHER REFERENCES

Groggins, "Unit Processes in Organic Synthesis," 3rd edition, pages 237–9 (1947).